United States Patent
Huang

(10) Patent No.: US 6,243,351 B1
(45) Date of Patent: Jun. 5, 2001

(54) AUTOMATIC BALANCING DEVICE OF OPTIC DISC DRIVE

(75) Inventor: Chien-Yi Huang, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/336,989

(22) Filed: Jun. 21, 1999

(51) Int. Cl.⁷ .................. G11B 17/00; G11B 25/00
(52) U.S. Cl. .................................................. 369/263
(58) Field of Search ............................ 369/263, 264, 369/270, 271; 360/99.04, 99.05, 99.08, 99.12

(56) References Cited

U.S. PATENT DOCUMENTS

| | | | |
|---|---|---|---|
| 5,845,542 | * 12/1998 | Hannah et al. | 74/573 R |
| 6,005,749 | * 12/1999 | Ikuta et al. | 360/99.12 |
| 6,160,780 | * 12/2000 | Furukawa et al. | 369/75.2 |

* cited by examiner

Primary Examiner—George J. Letscher
Assistant Examiner—Julie Anne Watko
(74) Attorney, Agent, or Firm—Rosenberg, Klein & Lee

(57) ABSTRACT

An automatic balancing device of an optic disc drive includes a circular disk made of ferromagnetic material mounted to an output spindle of a motor of the optic disc drive and a circular tray supported on the circular disk. The circular tray has a central axle and defines an annular space around the axle and a plurality of circular channels concentrically surrounding the annular space. A ring magnet is retained in the annular space for attracting the circular disk thereby soundly retaining the circular tray on the circular disk. A plurality of weight balls are received in each of the circular channels and are allowed to freely roll in the corresponding channels. A cover is attached to the circular tray for retaining the balls in the channels and supporting and driving an optic disc. When the motor is actuated and the circular tray is rotated, the balls are free to roll in the corresponding channels thereby automatically achieving balance of rotation of the optic disc.

13 Claims, 3 Drawing Sheets

AUTOMATIC BALANCING DEVICE OF OPTIC DISC DRIVE

FIELD OF THE INVENTION

The present invention generally relates to an optic disc drive, such as CD-ROM and DVD, and in particular to an automatic balancing device of an optic disc drive for automatically balancing rotation of an optic disc during the operation of the optic disc drive.

BACKGROUND OF THE INVENTION

An optic disc drive, such as CD-ROM and DVD, is an important data storage device of a computer system. The operational speed of the optic disc drive has been significantly increased recently. The high operational speed makes vibration caused by operation of motor or unbalance weight of a disc more severe for such a vibration may result in undesired access error. Thus it is desired to have a balancing device for achieving balance of rotation of an optic disc and reducing the vibration caused thereby during the operation of the optic disc drive.

SUMMARY OF THE INVENTION

Accordingly, an object of the present invention is to provide an automatic balancing device of an optic disc drive for achieving balance of rotation of an optic disc and reducing vibration induced thereby during operation of the optic disc drive.

Another object of the present invention is to provide an automatic balancing device for reducing vibration during operation of an optic disc drive, the automatic balancing device being modifiable to suit for different types of optic disc drive.

To achieve the above object, in accordance with the present invention, there is provided an automatic balancing device of an optic disc drive comprising a circular disk made of ferromagnetic material mounted to an output spindle of a motor of the optic disc drive and a circular tray supported on the circular disk. The circular tray has a central axle and defines an annular space around the axle and a plurality of circular channels concentrically surrounding the annular space. A ring magnet is retained in the annular space for attracting the circular disk thereby soundly retaining the circular tray on the circular disk. A plurality of weight balls are received in each of the circular channels and are allowed to freely roll in the corresponding channels. A cover is attached to the circular tray for retaining the balls in the channels and supporting and driving an optic disc. When the motor is actuated and the circular tray is rotated, the balls are free to roll in the corresponding channels thereby automatically achieving balance of rotation of the optic disc.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
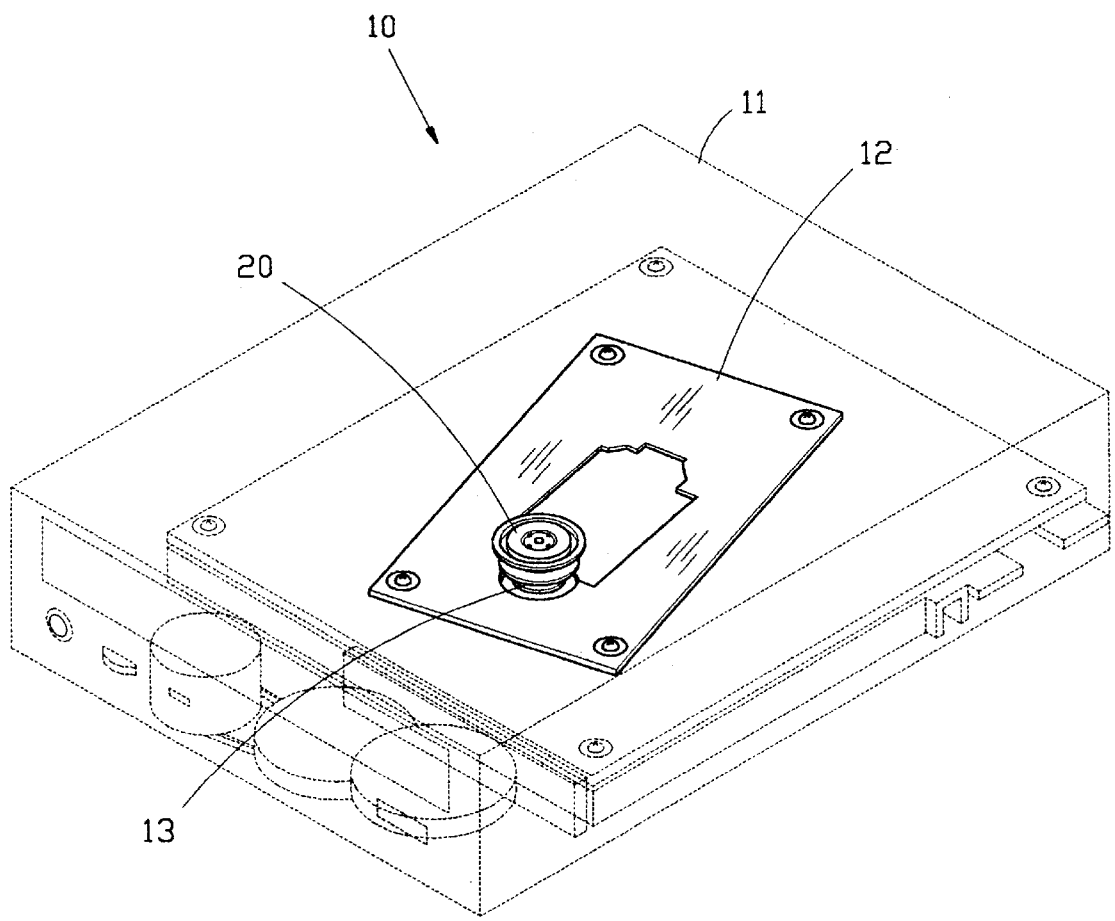
FIG. 1 is a schematic view showing an automatic balancing device in accordance with the present invention mounted in an optic disc drive.
Figure 2:
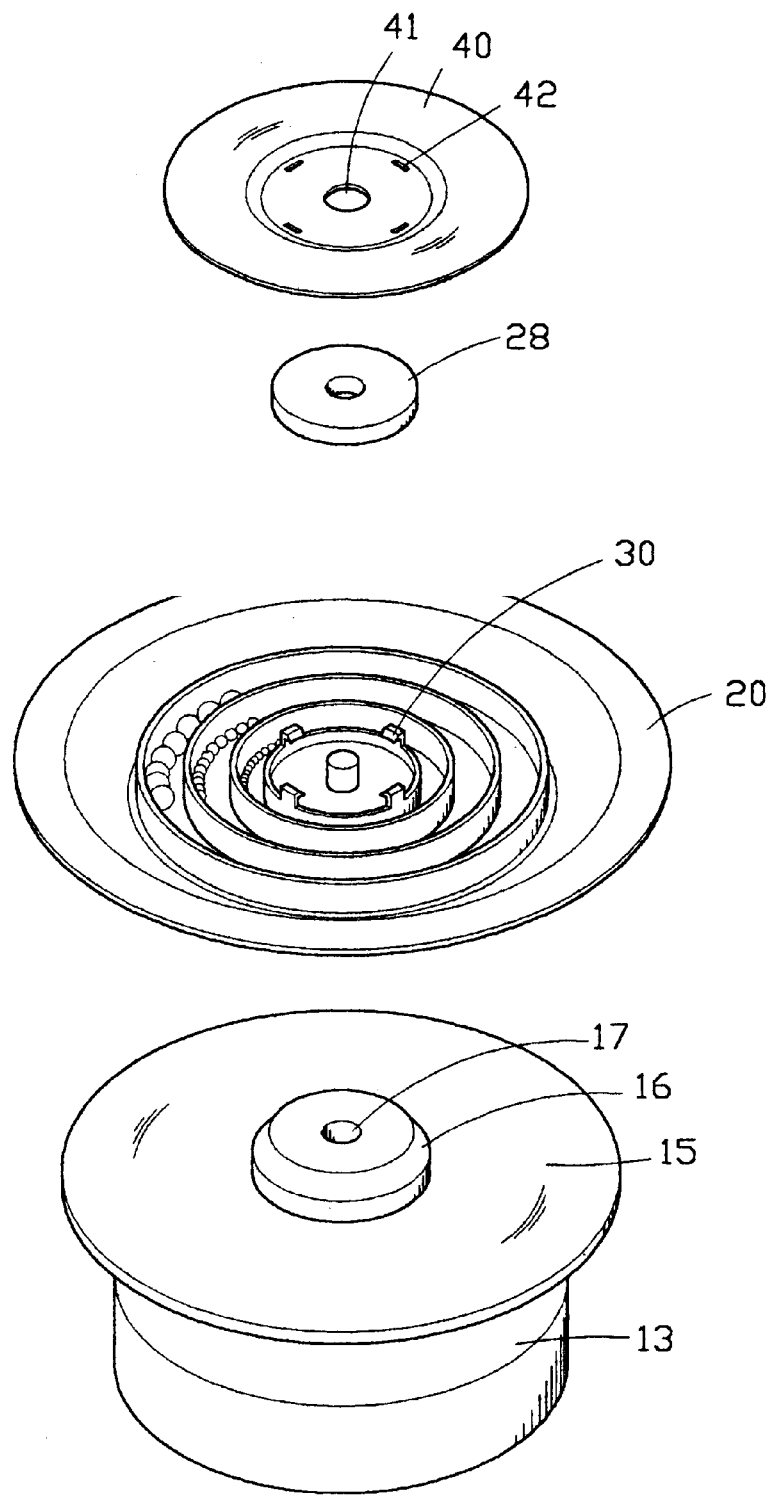
FIG. 2 is an exploded perspective view of the automatic balancing device in accordance with the present invention.

With reference to the drawings and in particular to FIGS. 1 and 2, an automatic balancing device constructed in accordance with the present invention comprises a circular tray 20 coupled to and driven by a motor 13 that is mounted on a support member 12 arranged inside an enclosure 11 of an optic disc drive 10. An optic disc (not shown) that is positioned in the optic disc drive 10 is supported on and driven by the automatic balancing device of the present invention.

Figure 3:
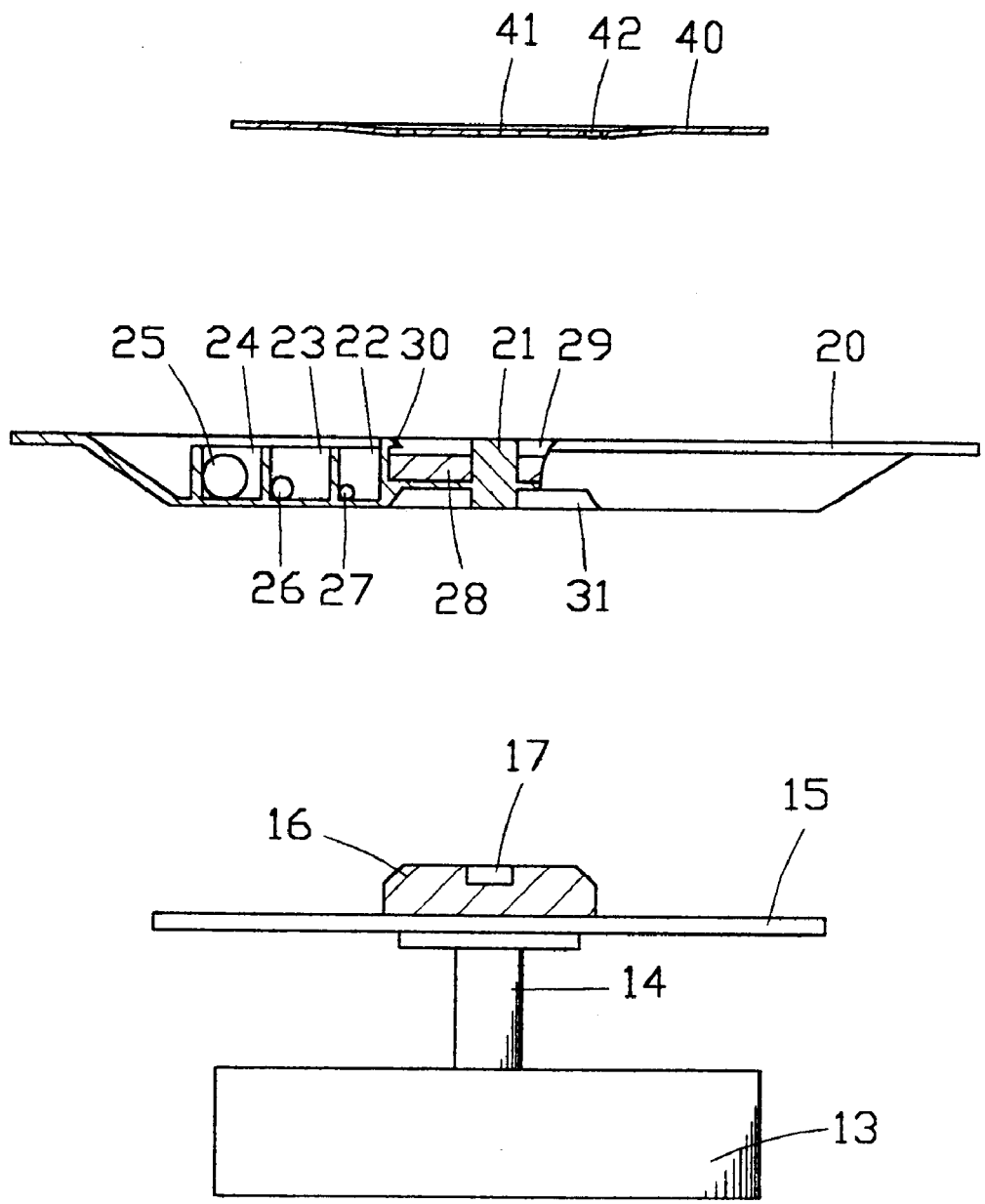
FIG. 3 is an exploded side elevational view of the automatic balancing device of the present invention with portions thereof cut away for showing inside structure thereof.

As shown in FIGS. 2 and 3, the motor 13 has an output spindle 14 having a free end to which a flat disk 15 is coaxially mounted. A cylindrical portion 16 is formed on center of the disk 15 and defines a central blind hole 17.

The circular tray 20 forms a plurality of concentric circular channels 22, 23, 24 surrounding a central axle 21. Upper and lower annular spaces 29, 31 are defined between the central axle 21 and the inner circular channel 22. A ring magnet 28 is received and retained in the upper space 29. The lower space 31 is snugly fit over the cylindrical portion 16 of the disk 15 with a lower end of the axle 21 received in the blind hole 17 of the cylindrical portion 16. The disk 15 is made of ferromagnetic material whereby a magnetic attraction is formed between the magnet 28 and the disk 15 for soundly retaining the circular tray 20 on the disk 15.

In each of the circular channels 22, 23, 24, a plurality of weight balls 27, 26, 25 are movably received. The balls 27, 26, 25 are allowed to freely roll in the corresponding channels 22, 23, 24 whereby when the motor 13 runs and the tray 20 rotates, the balls 27, 26, 25 roll along an outer wall of the corresponding channel 22, 23, 24 thereof and automatically achieve balance of rotation of the tray 20 and the optic disc supported thereon.

A cover 40 is releasably attached to the tray 20 for retaining the balls 27, 26, 25 in the corresponding channels 22, 23, 24. The cover 40 defines a central hole 41 fit over an upper end of the axle 21 and a plurality of openings 42 for engaging with resilient barbs 30 formed on the tray 20 thereby securing the cover 40 to the tray 20.

The number and size of the balls 27, 26, 25 in each channel 22, 23, 24 may be varied as desired in order to match different types of optic disc drive. For example and as shown in the drawings, the size of the balls 27 in the inner channel 22 is smallest, while that of the balls 25 of the outer channel 24 is largest.

Although the present invention has been described with respect to the preferred embodiment, it is contemplated that a variety of modifications, variations and substitutions may be done without departing from the scope of the present invention that is intended to be defined by the appended claims.

What is claimed is:

1. An automatic balancing apparatus for an optical disk drive device comprising:

(a) a support member coupled to a drive motor spindle;

(b) a circular tray coaxially disposed on said support member to coaxially engage said drive motor spindle, said circular tray having a plurality of upwardly open compartments concentrically formed thereon, at least one of said compartments describing an upper recess defining an upper annular space and a portion of said compartments defining a plurality of annular channels, each said annular channel containing a plurality of weight balls substantially in freely displaceable manner therein;

(c) a magnetic member received in said upper annular space for releasably capturing said circular tray against said support member; and, (d) a cover releasably secured to said circular tray to detachably cover at least a portion of said upwardly open circular tray compartments, including said annular channels;

whereby said weight balls freely disperse within said respective annular channels thereof responsive to the rotation of said circular tray for balancing the rotational drive of the optical disk drive device.

2. The automatic balancing apparatus as recited in claim 1 wherein said support member has a circular disk configuration.

3. The automatic balancing apparatus as recited in claim 2 wherein at least a portion of said support member includes a ferromagnetic material composition.

4. The automatic balancing apparatus as recited in claim 2 wherein said circular tray includes a central axle portion projecting axially downward therefrom, said central axle portion coaxially engaging a blind hole formed axially into said support member.

5. The automatic balancing apparatus as recited in claim 4 wherein a part of said central axle portion projects axially upward into said upper recess.

6. The automatic balancing apparatus as recited in claim 5 wherein said magnetic member is formed with a ring configuration.

7. The automatic balancing apparatus as recited in claim 4 wherein said circular tray has formed in a bottom surface thereof a lower recess defining a lower annular space about said central axle portion.

8. The automatic balancing apparatus as recited in claim 7 wherein said support member includes a cylindrical projection formed centrally thereon, said cylindrical projection coaxially engaging said lower annular space of said circular tray.

9. The automatic balancing apparatus as recited in claim 1 wherein said circular tray includes a plurality of resilient barbs extending upward from at least one of said compartments thereof, said cover having formed therein a plurality of openings for engaging said resilient barbs.

10. The automatic balancing apparatus as recited in claim 9 wherein said cover has formed therein a central hole for coaxially engaging a central axle portion extending from said circular tray.

11. The automatic balancing apparatus as recited in claim 1 wherein at least three said annular channels are concentrically defined on said circular tray.

12. The automatic balancing apparatus as recited in claim 11 wherein said weight balls of each said annular channel are different in size from said weight balls of the other said annular channels.

13. The automatic balancing apparatus as recited in claim 12 wherein said weight balls contained in the radially outermost one of an adjacent pair of said annular channels are greater in size than said weight balls contained in the other of said adjacent pair of said annular channels.

* * * * *